J. H. JACKSON.
Bake Pan.
No. 42,535.                            Patented April 26, 1864.
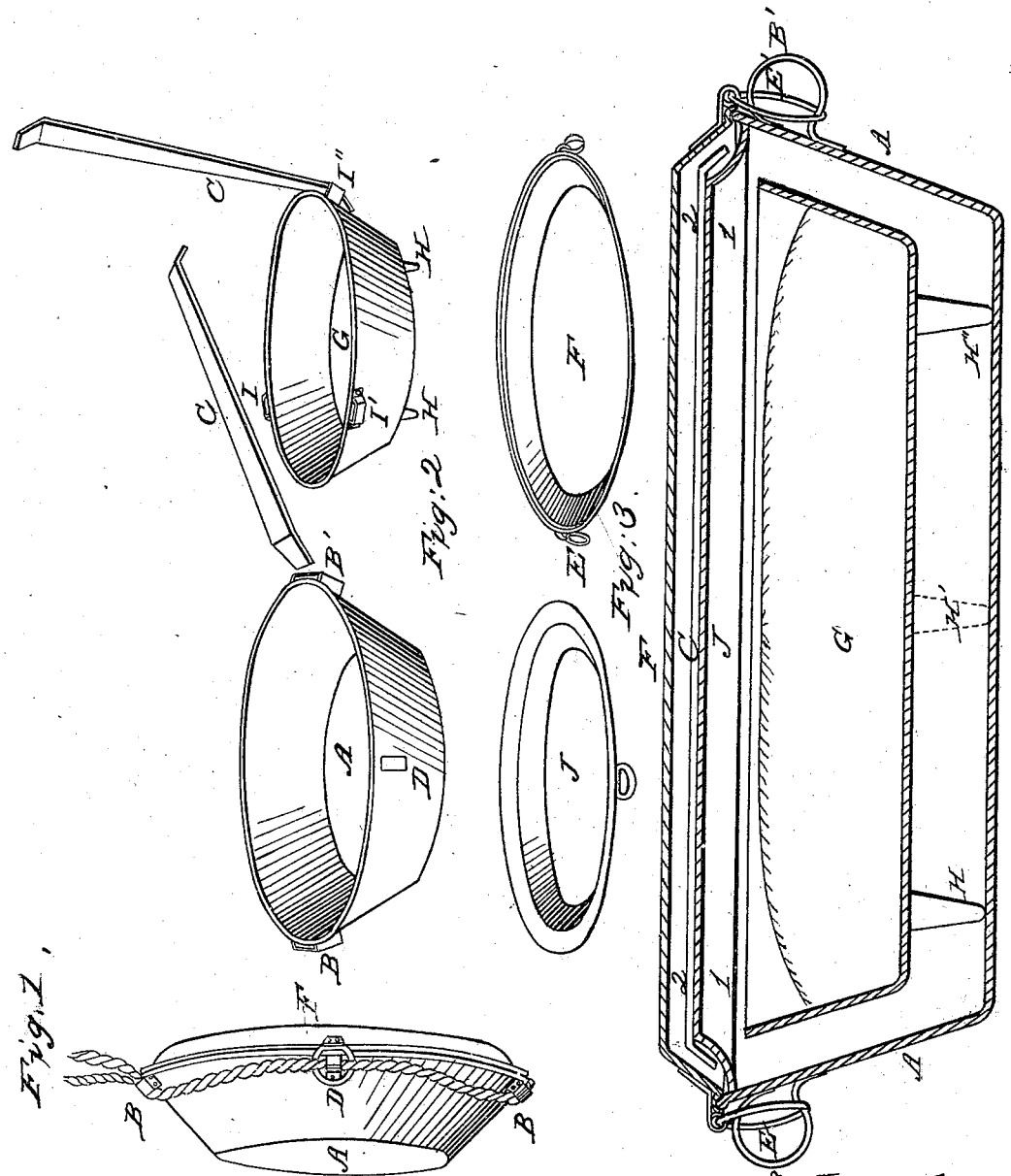

UNITED STATES PATENT OFFICE.

JOHN H. JACKSON, OF UNITED STATES ARMY, ASSIGNOR TO HIMSELF AND MAHLON M. WOMBAUGH, OF CINCINNATI, OHIO.

IMPROVEMENT IN PORTABLE BAKERS.

Specification forming part of Letters Patent No. 42,535, dated April 26, 1864.

*To all whom it may concern:*

Be it known that I, JOHN H. JACKSON, of United States Army, have invented a new and useful Portable Cooking Apparatus; and I do hereby declare the following to be a full, clear, and exact description thereof, reference being had to the accompanying drawings, making part of this specification.

My invention consists, essentially, of two or more covered pans or shallow vessels adapted to be "nested" one within the other, so as to leave a hot-air space or "jacket" within the larger pan, entirely enveloping the smaller one, the said jacket being closed above by one or more covers in such a way as to allow free communication between the jacket and the interior of the inner pan, the whole apparatus being constructed and arranged as hereinafter described, so that it may be readily attached together for use or transportation, and so that the various parts, when detached, may be used as a mess kit.

Figure 1 represents my apparatus in its closed form in condition to be slung over the owner's shoulder, or otherwise suspended from his person. Fig. 2 shows the same opened out to serve as a mess-kit. Fig. 3 is an axial section to full size of the apparatus in its closed form.

The material of the vessels may be cast or sheet iron or tin.

A represents a pan having ears, B B', for the reception of a handle or lifter, C, which lifter may be inserted so as to project nearly in the plane of the pan, so as to serve as a frying-pan, or nearly perpendicular to said plane, so as to serve as a ladle. The pan A may also have ears D D' on opposite sides, by which the apparatus may be suspended to the person, the same ears serving as catches for rings E E', which depend from the margin of a cover, F.

G is a pan, somewhat less both as to breadth and depth than the pan A, from the bottom of which it is elevated by means of feet H H' H''. The pan G has three ears, I I' I'', which serve the several uses of a socket for the lifter C and of a means of holding the pan centrally within the larger pan, A, and of a means of hanging the pan up on a wall when not required in connection with the other parts.

J is a cover or canopy, which in the closed form shown in Fig. 3 rests upon the flaring sides or upon an inward projection of the pan A, so as to permit free communication from the hot-air space or jacket 1 to the interior of the inner pan, G.

This apparatus may be used with or without the additional cover J, or the cover J only may be used and the cover F dispensed with; but it is preferred to use a double cover, providing a free communication is maintained between the jacket and the interior of the inner pan. Dough or other edibles being placed in the inner pan, G, and the apparatus being closed, (see Fig. 3,) and placed upon or within the fire, a very perfect baking action results, the air-jacket, which envelops the inner pan and canopy, serving to temper and equalize the heat while securing a very rapid completion of the baking. The separated parts may be used as plates, pans, ladles, &c., as may be desired. (See Fig. 2.)

The above described apparatus may be made wholly of double cross-tin and of stout wire, and need not exceed two pounds in weight nor occupy more room than a common canteen.

I claim as new and of my invention—

The portable cooker and mess-kit composed of the exterior pan, A, having ears D D' B B' for convenient suspension and for attachment of a cover, F E E', the interior pan, G, insulated from the pan A by projections H H' H'' I I' I'' and the interior elevated cover or canopy J, the whole being combined and operating in the manner set forth.

In testimony of which invention I hereunto set my hand.

JOHN H. JACKSON.

Witnesses:
GEO. H. KNIGHT,
JAMES H. LAYMAN.